United States Patent [19]
Bushman et al.

[11] Patent Number: 4,901,674
[45] Date of Patent: Feb. 20, 1990

[54] MULTI-SECTIONAL POWDER EMITTING ANIMAL COLLAR AND METHOD OF MAKING

[75] Inventors: Donald W. Bushman; Marissa A. Klapwald; John W. Mikkonen, all of County of Racine, Wis.

[73] Assignee: S. C. Johnson & Son, Inc., Racine, Wis.

[21] Appl. No.: 217,908

[22] Filed: Jul. 11, 1988

[51] Int. Cl.⁴ .............................................. A01K 27/00
[52] U.S. Cl. ..................................... 119/106; 119/156
[58] Field of Search ................. 119/106, 156, 159; 128/876, DIG. 15; 40/633

[56]  References Cited
U.S. PATENT DOCUMENTS

| | | | |
|---|---|---|---|
| 254,156 | 2/1882 | Ricker et al. | 119/106 |
| 1,127,249 | 2/1915 | Hughes | 119/106 |
| 1,203,590 | 11/1916 | Day | 119/156 |
| 2,138,040 | 11/1938 | Perry | 119/156 |
| 2,205,711 | 6/1940 | Banks | 119/156 X |
| 2,342,066 | 2/1944 | Tramill | 119/157 |
| 2,349,713 | 5/1944 | Finch | 119/106 |
| 2,401,253 | 5/1946 | Lamb, Jr. | 119/106 |
| 2,586,761 | 2/1952 | Eskola | 119/159 |
| 2,734,483 | 2/1956 | Peo | 119/160 |
| 2,762,158 | 9/1956 | Duffey | 424/412 X |
| 2,791,202 | 5/1957 | Doyle | 119/156 |
| 2,808,030 | 10/1957 | Costanzo | 119/106 |
| 3,213,830 | 10/1965 | Wiesemann | 119/157 X |
| 3,477,409 | 11/1969 | Costanzo | 119/106 |
| 3,811,413 | 5/1974 | Scherpenborg | 119/156 X |
| 3,814,061 | 6/1974 | Aries et al. | 119/106 |
| 3,827,107 | 8/1974 | Moore | 128/DIG. 15 X |
| 3,904,746 | 9/1975 | Aries | 119/159 X |
| 3,935,839 | 2/1976 | Goodwin | 119/156 |
| 4,031,859 | 6/1977 | Stewart | 119/106 |
| 4,047,505 | 9/1977 | McAndless | 119/156 X |
| 4,068,624 | 1/1978 | Ramney | 119/156 X |
| 4,150,109 | 4/1979 | Dick et al. | 119/156 X |
| 4,208,986 | 6/1980 | Costanzo | 119/106 |
| 4,226,036 | 10/1980 | Krug | 40/633 |
| 4,338,886 | 7/1982 | McBride | 119/156 X |
| 4,350,122 | 9/1982 | Shotwell | 119/156 X |
| 4,495,898 | 1/1985 | Akhavein et al. | 119/156 |
| 4,505,889 | 3/1985 | Amick | 424/411 |
| 4,506,630 | 3/1985 | Hair | 119/156 |
| 4,666,767 | 5/1987 | Von Kohorn et al. | 43/111 X |
| 4,671,960 | 6/1987 | Thielen et al. | 514/876 X |

FOREIGN PATENT DOCUMENTS 2529054 12/1983 France ............................ 119/106

Primary Examiner—Robert P. Swiatek

[57]  ABSTRACT

A thermoformed multi-sectional animal collar for containing and controllably emitting a powdered material is disclosed. A plurality of pores or openings contained in the collar structure is utilized to emit the powdered material onto an animal. The powdered material can be any material suitable for distribution on an animal, such as an insecticidal, medicinal, animal grooming or the like composition.

26 Claims, 3 Drawing Sheets

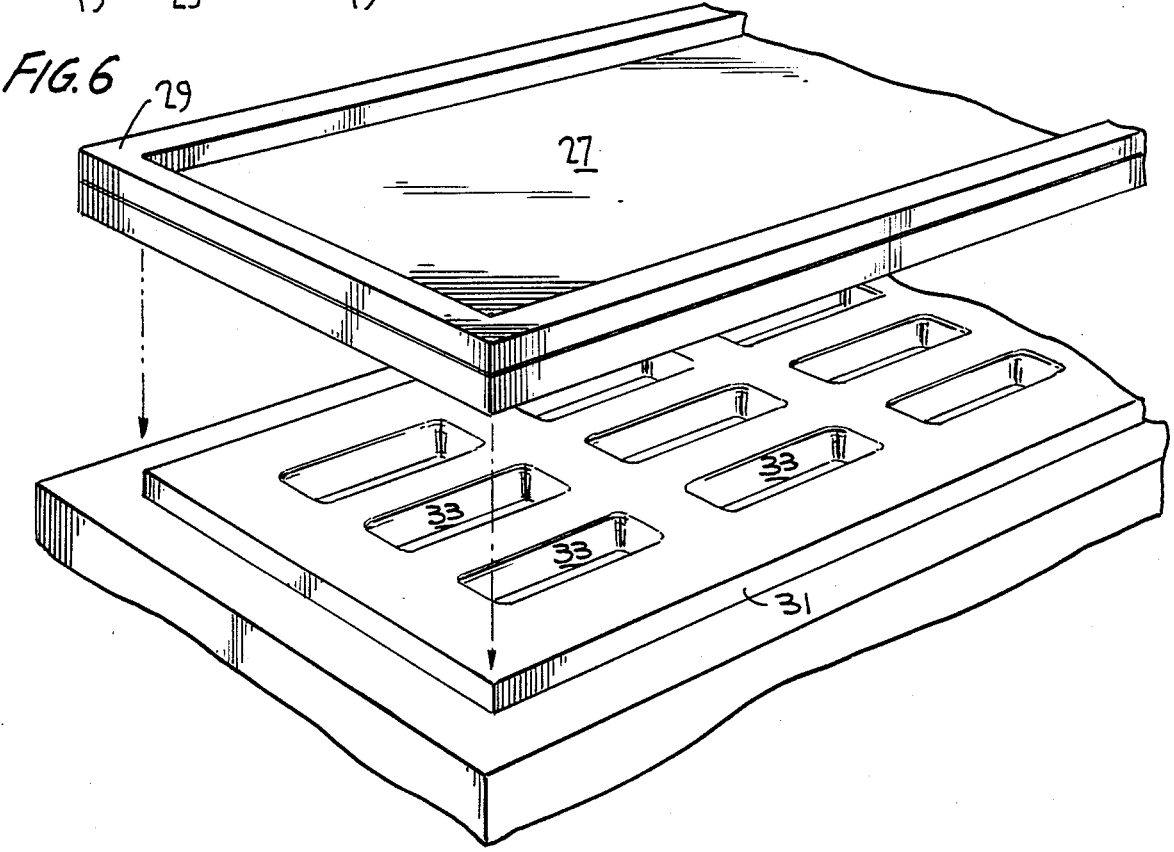

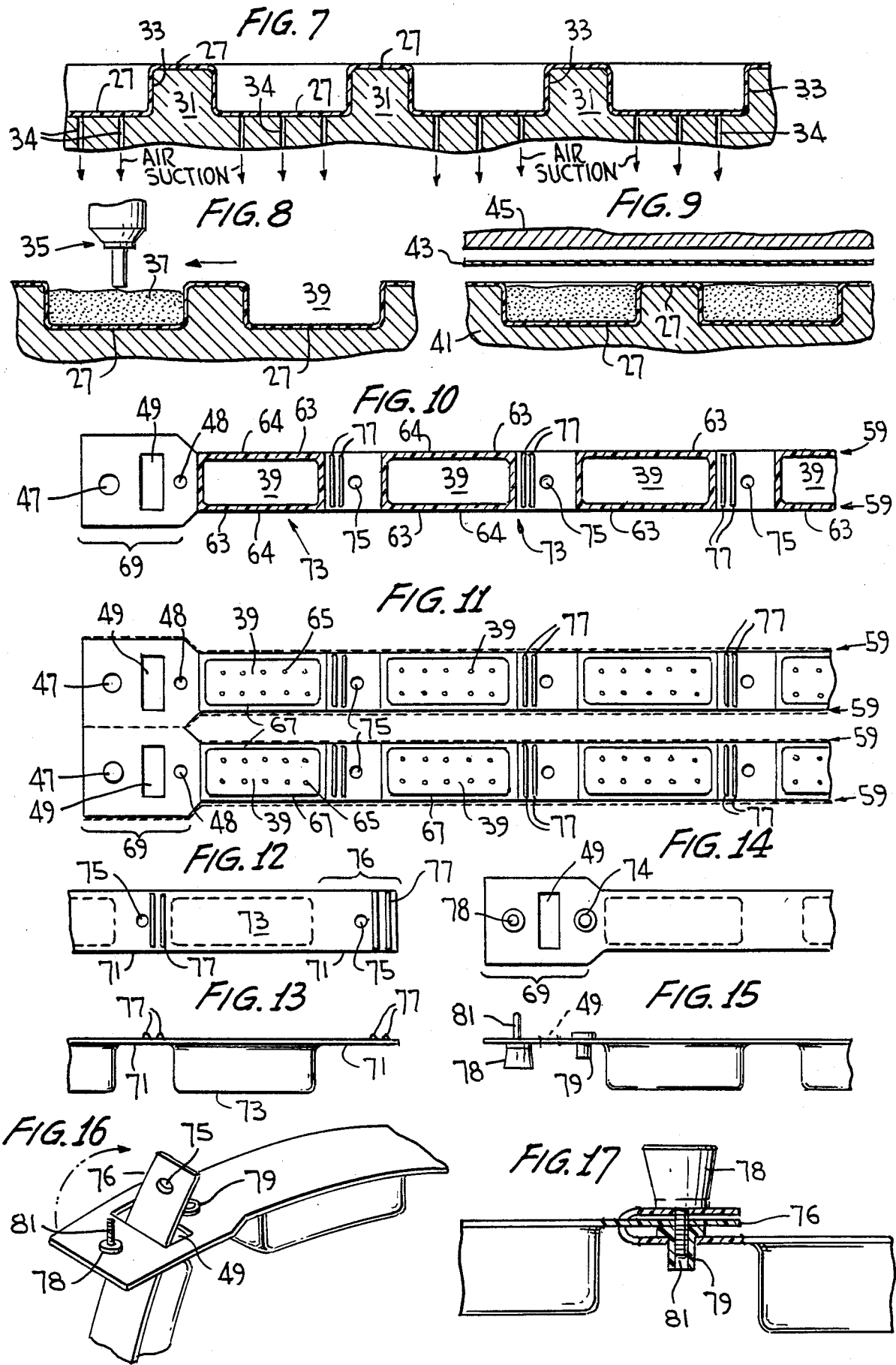

MULTI-SECTIONAL POWDER EMITTING ANIMAL COLLAR AND METHOD OF MAKING

FIELD OF THE INVENTION

The present invention is directed to a thermo-formed multi-sectional animal collar containing a powdered material. The powdered material is controllably emitted or released from the collar through pores or openings contained in individual sections of the collar during use of the collar on an animal. The powdered material can be any material suitable for distribution on an animal, such as an insecticidal, medicinal, animal grooming or the like composition.

BACKGROUND OF THE INVENTION

The prior art discloses various animal collars which are described as releasing a substance over a period of time onto the body of an animal. The material released is generally either a vapor emitted from a solid material or a powder dispensed from a particular collar structure. Collars for dispensing a powder necessarily utilize some form of compartment for holding the powder to be dispensed. U.S. Pat. Nos. 254,156; 2,342,066; 2,349,713; 2,401,253; 2,734,483; and 3,904,746 disclose examples of powder dispensing animal collars.

The prior art devices, however, do not controllably emit an amount of powder which effectively covers the animal as provided by the present invention. Further, the prior art devices do not emit an effective amount of powdered material over substantially the entire body surface of the animal for a predetermined extended period of time as provided by the present invention.

Additionally, and—we think—most importantly, the prior art does not disclose a thermoformed collar which provides for the controlled emission of a powdered material over an extended period of time using a plurality of pores in the collar wall as encompassed by the present invention.

OBJECTS OF THE INVENTION

One primary object of the present invention is to provide an animal collar, and a method for making the collar, for containing and controllably emitting a powdered material over an extended period of time through pores present in the collar walls.

A further object of the present invention is to provide a thermoformed animal collar, and the method for making the collar, for containing and controllably emitting a powdered material over an extended period of time through pores in the collar walls.

Yet another object of the present invention is to provide an animal collar, and the method for making the animal collar, having a bottom portion containing a plurality of pouch-like sections and a top sealing layer which are secured together to form a unitary structure for an animal collar which contains and controllably emits a powdered material through pores in the collar walls and over an extended period of time and a method for making the same.

Still another object of the present invention is to provide a disposable animal collar, and a method for making the collar, for containing and controllably emitting a powdered material over an extended period of time.

BRIEF SUMMARY OF THE INVENTION

Briefly stated, the animal collar of the present invention comprises a bottom portion and a top sealing layer or portion. The bottom portion, which defines a pouch-like section, and the top sealing layer or portion are secured together to form a unitary structure. The bottom portion thus provides a hollow section, or sections, suitable for holding a powdered material. Pores or openings are present either through the top sealing layer (which overlays each pouch-like section) or through the lengthwise extending side walls of each pouch-like section. The pores are positioned and dimensioned so as to emit or release a predetermined amount of the powdered material contained in the hollow section(s) at a desired rate over a predetermined period of time. The period of time is limited only by the volume of the hollow section or sections contained in the collar.

The collar is made utilizing a commercially available flexible or elastic material. The normal movement of the animal on which the collar is placed causes the collar to flex forcing the powdered material held within the collar to move out of the collar through the pores in the collar. The powdered material is then deposited onto the animal's skin and/or hair. The thus deposited material will then tend to move along the hair shafts of the animal's coat due to overlapping of the hair shafts and relative movement of the hair shafts.

The powdered material, generally having a particle size of about 20 microns to about 250 microns, can be any material which is suitable for distribution on the hair and/or skin of an animal. Suitable powdered materials include insecticidal, ectoparasitical, medicinal, animal grooming and the like compositions. The powdered material can be a mixture of an active ingredient and a particulate carrier. Additionally, an ingredient to increase the flowability of the powdered material can be contained in the mixture.

The presently preferred embodiment of the animal collar is a thermoformed plastic collar having a plurality of pouch-like sections formed in the bottom portion thereof. The pouch-like sections hold a powdered material. The pores, so formed in the collar as to provide for the above-mentioned controlled emission of the powdered material, can be positioned either through the lengthwise extending side walls of each pouch-like section or through the area of the top sealing layer overlaying each pouch-like section or through both, as desired. The pores that are formed in the sealing layer are preferably laser drilled. The pores that are present in the side walls of each pouch-like section are formed during the securing or welding of the top sealing layer to the bottom portion containing the pouch-like sections.

BRIEF DESCRIPTION OF THE DRAWINGS

In the drawings,

FIG. 1 is a partially fragmented side view of one preferred embodiment of the present invention which includes a plurality of pouch-like sections.

FIG. 2 is a top planar view of the embodiment presented in FIG. 1, showing a plurality of pores positioned in the top sealing layer of the collar.

FIG. 3 is a partially fragmented side view of another preferred embodiment of the present invention which includes a plurality of pouch-like sections and two openings, one opening formed in each lengthwise extending side wall of each individual pouch-like section.

FIG. 4 is a top planar view of a portion of the embodiment shown in FIG. 3.

FIG. 5 is a bottom view of the embodiment shown in FIGS. 3 and 4.

FIG. 6 is a partially fragmented perspective view of a flexible sheet material, utilized to form the bottom portion of the animal collar, superpositioned above a partially fragmented female cavity thermoform mold (also shown in perspective view).

FIG. 7 is a partially fragmented cross-sectional view showing the drawing of the flexible sheet material into the mold cavities by air suction.

FIG. 8 is a partially fragmented cross-sectional view, showing the filling of each thermoformed cavity or pouch-like section with a metered amount of powdered material.

FIG. 9 is a partially fragmented cross-sectional view, showing the relative positioning of the top sealing layer of the collar over the bottom thermoformed collar portion prior to welding the top sealing layer to the bottom portion.

FIG. 10 is a partially fragmented top planar view of the presently preferred embodiment shown in FIGS. 3 and 4, with the top sealing layer having been removed (for purposes of clarity) to show certain side wall structure of the bottom thermoformed collar portion which allows for the controlled emission of the powdered material from the pouchlike sections of the collar.

FIG. 11 is a partially fragmented top planar view of the presently preferred embodiment shown in FIGS. 1 and 2, with the top sealing layer having been removed (for purposes of clarity) to show certain wall structure of the pouch-like sections of the bottom thermoformed collar portion. The relative location of the plurality of pores (actually defined by the upper sealing layer), however, is shown in relation to the pouch-like sections, again for purposes of clarity. FIG. 11 further discloses the manner in which adjacent thermoformed collars are joined together, as a result of certain manufacturing operations.

FIG. 12 is a partially fragmented top planar view of the animal collar of the present invention showing the relative location of certain holes that are utilized in conjunction with a fastening means and further showing certain cut marks which are located between the individual pouchlike sections of the collar.

FIG. 13 is a side view of the animal collar disclosed in FIG. 12.

FIG. 14 is a partially fragmented top planar view of one terminal end of the animal collar having one type of preferred fastening means attached thereto.

FIG. 15 is a side view of the animal collar shown in FIG. 14.

FIG. 16 is a perspective view showing one preferred manner of joining the two terminal ends of the animal collar of the present invention, utilizing the one prefered fastening means that is shown in FIGS. 14 and 15.

FIG. 17 is a side view of one preferred fastening means shown in FIGS. 14-16 in a closed position.

PRESENTLY PREFERRED EMBODIMENT OF THE INVENTION

Figure 18:
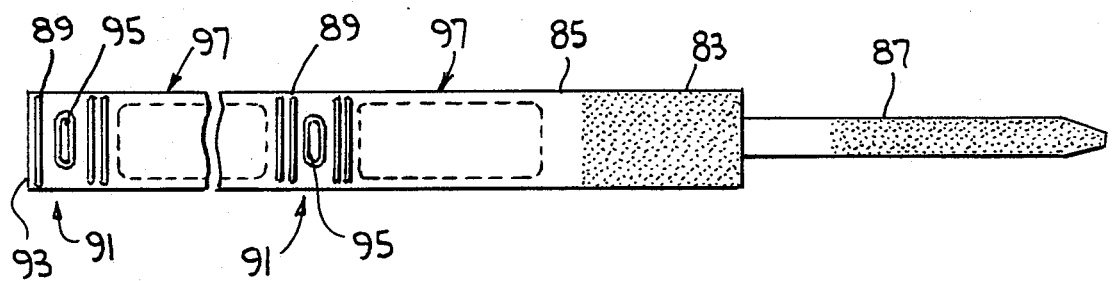
FIG. 18 is a top planar view of another preferred fastening means for holding together the two terminal ends of the animal collar of the present invention.

The animal collar of the present invention is preferably a multi-sectional collar for containing and controllably emitting a powdered material. The collar has a multi-sectional bottom portion and a top sealing layer or portion which are secured together to form a unitary structure. Thermoforming is utilized to provide for a plurality of individual connected pouch-like sections which make up the collar bottom portion. As will be appreciated by those skilled in the art, the animal collar can be formed having a single pouch section. However, a plurality of pouch-like sections is preferred to provide for an even distribution of powdered material (relative to that portion of the animal where the collar is to be worn) during the useful lifetime of the collar. The plurality of individual sections also provides a means for avoiding the compacting of the powdered material within the collar. This latter feature will be described in greater detail hereinbelow.

The powdered material, generally having a particle size of about 20 microns to about 250 microns and contained in the animal collar, can be any material suitable for distribution on an animal's hair and/or skin. The term "powdered material" as used herein is understood to encompass both a single powdered composition as well as a mixture of powdered compositions. Suitable powdered materials include insecticidal, ectoparasitical, medicinal, animal grooming, and the like compositions, as well as combinations thereof. The powdered material held within the collar is preferably a mixture of a particulate carrier and an effective amount of an active ingredient. Suitable particulate carriers include calcium carbonate, sodium carbonate, tricalcium phosphate, mineral, clay, silica powders and the like. Without limiting the scope of the present invention, the animal collar will be discussed in terms of containing an insecticide, such as a flea and/or tick repellent or like parasiticide, as the active ingredient. Suitable active ingredients include organophosphates, carbamates, pyrethins, pyrethoids, botanical derivatives or the like. Additionally, the mixture can optionally include an ingredient, such as silicate, to increase the flowability of the mixture.

The animal collars of the present invention are made from a flexible or elastic material, such as plastic. Suitable plastics include polyethylene, polypropylene, polyvinyl chloride and the like. The plastic material can be transparent, opaque or colored. A transparent material is preferred since it can be determined, simply by viewing the collar, whether the powdered material has been emitted and the collar needs to be replaced. The normal movement of the animal on which the collar is placed thus causes such an elastic collar to flex forcing the powdered material held in the collar to move out of the collar through the pores or openings formed in the collar wall structure. The thus emitted or released pesticidally-active particulate material is then deposited onto the animal's skin and/or hair. The thus deposited pesticidally-active particulate material will move along the hair shafts of the animal's coat due to overlapping of the hair shafts and relative movement of the hair shafts as the animal moves about. When an ectoparasitically-active material is thus emitted from the collar and deposited on the animal, fleas or other ectoparasites which come into contact with such an active, particulate material will be repelled or killed.

FIGS. 1 and 2 best show a first presently preferred embodiment of the animal collar of the present invention. The collar has a top sealing layer 1 and a bottom portion 3. The top layer and bottom portion are each made from a single piece of flexible material such as described above. The bottom portion 3 of the collar is a single piece of flexible material having a plurality of open top pouch-like sections 7 connected by flat flexible strips 9 formed unitarily therewith, as will be described in detail further hereinbelow. The top sealing layer has a plurality of pores or openings 5 positioned in spaced relationship extending through the top sealing layer 1. The pores 5 in the top layer 1 are preferably positioned so as to be in parallel rows relative to each other and are further preferably positioned relative to the bottom portion 3 so as to be in substantially overlaying relationship with the open tops of pouch-like sections 7 of the bottom portion 3 of the collar. (See FIG. 2) The top sealing layer 1 is secured to bottom portion 3 in a manner so as to form a substantially unitary collar structure. (FIG. 1) Holes 11 are positioned in the center of strips 9. (FIG. 2) Such holes 11 are utilized in conjunction with a fastening means (discussed further hereinbelow) which is used to hold the collar in place on an animal. The function of such holes will be described more fully below in relation to each preferred embodiment of the hereinbelow-discussed fastening means.

A second presently preferred embodiment of the animal collar is best shown in FIGS. 3 and 4. As with the first preferred embodiment, the collar has a top sealing layer 13 and a bottom portion 15. The top sealing layer 13 is preferably a single sheet of flexible material which is affixed or secured in a suitable manner to bottom portion 15 which is also preferably a single piece of flexible material. No pores or openings are contained in the top layer 13 in the second embodiment. The bottom portion 15 has a plurality of open top pouch-like sections 17 unitarily connected by flat strips 19. A powdered material is contained within each pouch-like section. The top edge of each lengthwise extending side wall 21 of each pouch-like section 17 has positioned therein at least one lateral opening 23. (See FIG. 3) Preferably, each lengthwise extending side wall will have at least one such opening 23. Accordingly, it can readily be appreciated that two such openings will be associated with each pouch-like section, i.e. one such opening through each of the two sidewalls. (See FIG. 4) When the top layer 13 is overlayed and secured by a suitable means to the bottom portion 15 (FIG. 3), the openings in the top side walls are able to pass pesticidally-active particulate material from the pouch-like sections 17 (where such material is contained) onto the animal, in the manner described above. These openings 23 thus extend from the interior of the pouch-like sections 17 to the collar exterior. The powdered material contained in the pouch-like sections are thus emitted through these openings.

As shown in FIG. 4, certain other holes 25 are positioned in the animal collar of the second embodiment. Such holes 25 are located preferably in the center of flat strips 19 and are used in conjunction with the above-mentioned fastening means to attach the collar to an animal. The function of such holes 25 is further described below in relation to a fastening means.

The plurality of holes 5 formed in the top sealing layer 1 of the first embodiment (FIG. 2) and the openings 23 formed in the side walls of each pouch-like section 17 of the second embodiment (FIG. 3) allow for the movement of the powdered material contained in the hollow sections of the animal collar out of the hollow sections to be deposited on the hair and/or skin of the animal on which the collar is placed. The same basic collar structure is present with either embodiment. The difference between the embodiments is in the formation and location of the pores or openings which are part of the emission system. As shown in FIG. 5, the bottom view of the animal collar is the same no matter where the pores or openings, used in emitting the powdered material, are located. Thus, as shown in FIG. 5, the thus illustrated pouch-like sections 24 correspond to the above-described pouch-like sections 7 and 17 of the above-discussed embodiments, shown in FIGS. 1 and 3 respectively. Similarly, and as also shown in FIG. 5, holes 22 correspond to holes 11 and 25 of the above-discussed embodiments shown in FIGS. 2 and 4 respectively.

The amount of powdered material contained in the collar can range from approximately $\frac{1}{2}$ to 2 ounces depending on the particular formulation of the powdered material and the size of the animal which will be wearing the collar.

The emission of the powdered material from the individual collar compartments 7 and 17 is controlled by a number of factors which can be combined in varying relationships to provide for the most effective emission of material from the collar for a predetermined period of time.

Preferably, the particle size of the powdered material is the same for all formulations regardless of the individual collar-wearing animal's size. It can be appreciated, however, that size of the animal will generally be determinative of the relative quantity of particulate material that is utilized over time. The determination of the appropriate amount of powdered material to use with a particular sized animal is determined, not by the rate of release, but by the number of hollow sections making up the overall collar. The collar is thus preferably made in a specified length (or lengths) so that the collar can be worn by a large-necked dog; and the collar can readily be reduced in length to fit onto the neck of a small-necked or medium-neck-sized dog.

Prior to placement of the collar around the neck of an animal, the consumer will thus size the collar to the animal and cut off any excess length. At the same time, accordingly, the consumer will be determining the number of hollow sections to be present which in turn will determine the volumeric quantity of powdered material which will be emitted onto the animal.

The rate of emission of the powdered material over a predetermined period of time is controlled by a number of interrelated factors. Such factors include the number and positioning of the pores in each hollow section, the wall thickness of each hollow section, the diameter size of each pore, and the degree of flexibility or elasticity of the sheet material utilized to form the collar. The flexing of the collar by an animal's movement in turn causes the powdered material to move out of the individual hollow sections through the pores. Accordingly, the more flexible the material used to make the collar, the more the collar will flex in response to an animal's movement and act on the powdered material contained in the hollow sections.

One or more of the above factors can be adjusted to determine a maximum effective emission rate in view of the period of time in which emission of the powdered material should continue. Preferably, it is desirable to combine the above factors to provide for the emission of a powdered material from a collar for a period of from about 4 to about 6 weeks. To achieve such a result, we have found that the pore diameter of, e.g., the embodiment shown in FIG. 2 thus can preferably range from about 0.005 to about 0.025 inches. We have also found that the lateral opening of, e.g., the embodiment shown in FIG. 3, can initially be formed so as to be about 0.125 inches at its widest dimension, to achieve such a result. It can be appreciated, of course, that such a lateral opening dimension will be reduced somewhat, after being subjected to the heat-sealing step (described hereinbelow), as a result of the heat-sealing temperature and the physical properties of the materials that are heated. Presently, it has been found that up to about 99.9% of a powdered material having a maximum particle size of about 250 microns will pass through a pore arrangement equivalent to 60 mesh for a period of from about 4 to about 6 weeks. (As used herein, all mesh sizes will refer to U.S. Sieve Series; and all percentages will be weight percentages, unless otherwise indicated). Other physical property considerations that are able to provide for a controlled emission of material for a period of from about 4 to about 6 weeks include the following:

(a) about 98.5% of a powdered material will pass through the equivalent of a 100 mesh opening when the maximum particle size is about 150 microns;

(b) about 85% of a powdered material will pass through the equivalent of a 200 mesh opening when the maximum particle size is about 76 microns; and (c) about 70% of a powdered material will pass through the equivalent of a 325 mesh opening when the maximum particle size is about 45 microns.

As mentioned above, the preferred number of openings 23 contained in the embodiment shown in FIGS. 3 and 4, is preferably two for each such pouch-like section 17, i.e. one opening 23 on each side of individual pouch-like sections 17. Additional openings can be included depending upon the length of each pouch-like section. However, if the openings are too great in number and/or too close to each other in relative spacings, the seal between the top edge of the bottom portion 15 side walls and the top sealing layer 13 will not be as effective as it otherwise might be. The amount of surface area connecting the top sealing layer 13 to the bottom portion 15 would be decreased, as can be appreciated by referring to FIG. 3. However, that minimal amount of thus connecting surface area which is necessary to achieve the desired result is readily determinable to those skilled in the art.

The illustrated method of making the animal collar of the present invention begins with thermoforming the bottom portion 3 or 15 from a flexible plastic sheet in a female cavity thermoform mold, such as that shown for example in FIG. 6. Those skilled in the art can appreciate however, that the bottom portions 3 and 15 can readily be thermoformed from a male-type thermoform molding apparatus (not shown).

The bottom portions 3 and 15 of the preferred embodiments of the present invention are made, as was mentioned above, from a flexible sheet, such as plastic. Suitable plastic sheet materials include polyethylene, polypropylene, polyvinyl chloride and the like.

The bottom portion of each embodiment is thus shown as being made utilizing the same thermoforming method, for purposes of illustration. Thus briefly, referring to FIG. 6 for purposes of discussing the exemplary female-cavity thermoforming procedure, a flexible sheet 27 is shown as being held by frame 29 and heated using any conventional method known in the art. The flexible sheet 27 is then laid, for example, over the illustrated female cavity thermoform mold 31. The illustrated mold 31 has pouch-shaped cavities 33 formed in the mold in rows along the length and width of the mold. The mold can, e.g., have from about 3 rows of up to about 3 cavities each, as is shown in FIG. 6. However, this is not a limit, as up to about 30 rows of up to about 15 cavities each is presently contemplated. Accordingly, one mold will make the bottom portion for a predetermined number of collars, each such collar having a predetermined number of pouch-like sections. The thickness of the flexible sheet 27 shown in FIG. 6 is within the range of from about 0.020 in to about 0.060 in., preferably about 0.050 in.

After the heated flexible plastic sheet 27 has been positioned on the mold, air suction is applied from beneath the mold via passageways 34 to draw the plastic sheet 27 against and into the mold surface 31. (FIG. 7) The drawing of the plastic sheet 27 into cavities 33 results in the formation of a plurality of connected pouch-like sections which correspond to sections 7 and 17 of the preferred embodiments. (See, e.g., FIGS. 1 and 3) Once the plastic sheet has been fully drawn into the cavities 33 of the mold 31 (FIG. 7), the flexible material 27 is then allowed to cool. Although not presently employed in the manufacture of the illustrated collar, it can be appreciated by those skilled in the art that a male part (or so-called "plug"), so dimensioned relative to the cavity as to be readily disposable therein, can at times be utilized to assist in the thermoforming of the flexible sheet material. For example, such a plug is often used to urge the flexible sheet material into the mold cavity while the vacuum-forming step is taking place.

Following cooling of the thermoformed material, the flexible sheet, now having a plurality of pouch-like sections, is removed from the thermoform mold.

Each pouch-like section, i.e. each thermoformed cavity in the flexible sheet, is then filled with a desired amount of powdered material. As shown in FIG. 8, for example, a filler mechanism 35 can be utilized to dispense a metered amount of powdered material 37 into individual pouch-like sections 39 of the thermoformed sheet 27. Alternatively, another mechanism (not shown) can be utilized to place a tablet (or so-called "caplet") into the thus-formed pouch-like sections. It can, accordingly, be appreciated that such a caplet would be so dimensioned relative to the dimensions of the pouch-like sections as to provide the external surface of the collar with a relatively flat appearance, which is desirable to the ultimate consumer.

Up to this point, the method of making the animal collars of the present invention is the same for each of the preferred embodiments of the present invention. At the point when the top sealing layer 1 or 13 is affixed to the bottom portion 3 or 15 respectively (FIGS. 1 or 3), various modifications in the method are made to account for the difference in the location and number of emission openings present in the collar.

Specifically, following the filling of the cavities formed in the flexible material with powdered material (FIG. 8), the sheet containing the filled cavities is positioned on a tooling support 41. (FIG. 9) A second flexible sheet of plastic 43, which becomes the top sealing layer 1 or 13 (FIGS. 1 or 3), is positioned over the filled thermoformed sheet. (FIG. 9) A welding tool 45 is then utilized to secure by welding the flexible sheet 43 to the thermoformed sheet 27. (FIG. 9) With respect to the first embodiment shown in FIGS. 1 and 2, the flexible sheet 43 has been pre-drilled with pores which correspond to openings 5. Holes 5 are preferably formed in top sheet 43 by laser drilling. Laser drilling forms a clean cut without any distortion (or so-called "flash") forming around the edges of the holes which might impede movement of the powdered material through the holes. Such laser-drilled holes are generally circular in transverse cross-section, but occasionally can be slightly elliptical. Accordingly, laser drilling allows for a more exact and controlled emission of the material held within the collar.

Regarding the second embodiment shown in FIGS. 3 and 4, the lateral openings 23, are simultaneously formed with the securing of the flexible sheet 43 to the thermo-formed portion having a plurality of connected pouch-like sections 27 (FIG. 7). Additionally, with respect to both embodiments, the following features are also formed during the welding of top layer 43 to the thermoformed filled sheet 27:

(1) openings or holes 11 (FIG. 2), 25 (FIG. 4) or 75 (FIG. 10) which are positioned between the plurality of pouch-like sections 7 (FIG. 1), 17 (FIG. 3), and 73 (FIGS. 12 and 13);

(2) holes 47 and 48, and slots 49 located at one terminal end 69 (FIGS. 10 and 11) of the collar;

(3) tear marks 59 (FIG. 11) located along the perimeter of each collar; and (4) cut marks 77 disposed transverse to the tear marks 59 (FIG. 11).

The specific emission system for each above-mentioned embodiment is more specifically shown, for example, in FIGS. 10 and 11.

FIG. 10 thus depicts the second embodiment of the animal collar, substantially as shown in FIGS. 3 and 4 but with the top sealing layer having been removed (for purposes of clarity). Gaps or openings 63 of the emission system are formed when the top flexible sheet 43 is welded to the thermo-formed bottom flexible sheet 27. (FIG. 9) The welding tool 45 (FIG. 9) utilized to secure the top sheet 43 in place on the bottom sheet, contains a means (not shown) by which gap 63 is formed in each lengthwise extending side wall 64 of each hollow section 39. (FIG. 10) Gaps 63 of FIG. 10 correspond to openings 23 of FIGS. 3 and 4. As stated above, the size of gaps 63 is such that the emission of the powdered material contained within the plurality of hollow sections in the animal collar is over an extended predetermined period of time.

FIG. 11, in turn, thus depicts the first embodiment of the animal collar partially shown in FIGS. 1 and 2 wherein the emission system includes a plurality of pores or holes 5 formed in the top flexible sheet 43. Top sheet 43 is preferably pre-drilled to provide the plurality of holes 5. When the top sheet 43 is positioned over bottom sheet 27 during the welding of sheet 43 to sheet 27, the emission holes or pores 5 are arranged in substantially parallel rows over the thermoformed cavities 39 (containing powdered material 37 as shown in FIG. 11). (FIG. 11 has had the top sealing layer 43 removed for purposes of clarity, so as to show, for example, the open top wall structure of the pouch-like sections in the collar.) The number 65 (in FIG. 11), however, denotes where holes or pores 5 would be located if the top sealing layer 43 was welded to the collar bottom portion.

Following the securing of the top sheet 43 over the thermoformed bottom sheet 27 (FIG. 9), the perimeter 67 of each pouch-like section 39 (FIG. 11) is sealed leaving the holes 5 (FIG. 2) in the top sealing layer 43 (FIG. 9) as the only exit means for the powdered material from the pouch-like sections 39. The diameter and positioning of the holes is determined as described above in relation to the particle size of the powdered material and flexibility of the sheet material utilized to form the collar so that an effective amount of powdered material will be controllably emitted over an extended predetermined period of time.

FIG. 11 also shows the manner in which the collars are connected during the thermoforming and welding operations. A tear mark or seal 59 is formed during the welding operation along the perimeter of each collar. Following the completion of the welding operation, the collars are separated from each other along the tear seal 59 to provide individual animal collars. The formation of the animal collars is then complete with the exception of attaching a fastening means to terminal end 69 (FIGS. 10 and 11) so that the collars can be held in place around the neck of an animal.

The same fastening means can be utilized with each preferred embodiment of the animal collar of the present invention. One preferred fastening means is disclosed in FIGS. 14–17.

When a collar is to be fastened around the neck of a particular animal, the collar is sized to the animal by extending the collar around the animal's neck. Any excess in length is cut off. The cut is made by the consumer across the width of the collar at an appropriate flat portion 71. (FIG. 12 and 13) Flat portion 71 is the area connecting the individual powder-filled pouch-like sections 73. The collar is cut along an appropriate cut mark 77 thereby leaving hole 75 in what becomes the other terminal end 76 (FIGS. 16 and 17) of the collar. Cut marks 77 are formed in the flat portion 71 during the welding operation and serve as a guide for the consumer. Hole 75 is utilized with a fastening means located on the collar's opposite terminal end 69 to provide a closure for attaching the collar around an animal's neck.

One preferred fastening means utilizes a pin 78 and pin-receiving member 79 having a structure as shown in FIGS. 14–17. Pin 78 is positioned in hole 47 (FIGS. 10 and 11) which was formed during the welding operation described above. Pin-receiving member 79 (FIGS. 15 and 16) is positioned in hole 48 (FIGS. 10 and 11) which was also formed during the welding operation.

To fasten the collar around the neck of an animal, terminal end 76 containing hole 75 is placed through slot 49. (FIG. 16) Slot 49 was also formed during the welding operation. The outwardly projecting end 81 of pin 78 is then inserted through hole 75 and folded over so that end 81 is inserted into pin-receiving member 79. The interior of pin-receiving member 79 is shaped complimentary to the end 81 so that end 81 is held within pin-receiving member 79 as shown in FIG. 17 to provide a fastened closure holding terminal ends 69 (FIG. 14) and 76 (FIG. 17) together. The collar is then secured to the animal until the consumer pulls pin 78 out of receiving member 79.

Figure 19:
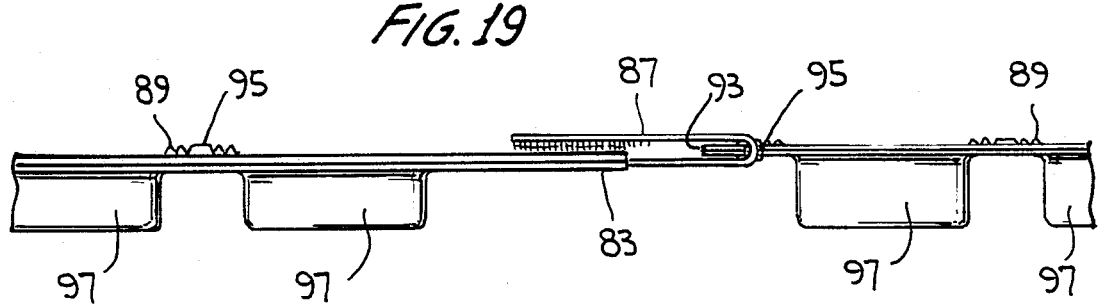
FIG. 19 is a side view of the animal collar and the fastening means shown in FIG. 18 wherein the fastening means is in a closed position and thus holding the two terminal ends of the animal collar together.

Another preferred fastening means is shown in FIGS. 18 and 19 and comprises a hook and loop-type fastener, such as a Velcro-type closure device, having a loop-containing portion 83 and hook-containing portion 87. As will be apparent to one skilled in the art, when the velcro-type closure means as shown in FIGS. 18 and 19 is to be utilized with the animal collar of the present invention, terminal end 69 as shown in FIG. 11 is not required to be formed during the thermoforming operation. The collar instead will be comprised of a predetermined number of pouch-like sections 97 [corresponding to pouch-like sections 7 (FIG. 1) and 17 (FIG. 3)] and a corresponding number of flat flexible strips 91 [corresponding to flat flexible strips 9 (FIG. 1) and 19 (FIG. 7)] for joining pouch-like sections 97 and being one terminal end 93 of the collar such as further described below. The other terminal end 85, to which the loop-containing portion 83 of the fastening means is attached, does not require a flat flexible strip as shown in FIG. 18, although of course, one can be present and the loop-containing portion 83 attached thereto.

The above alterations in the animal collar structure are understandable and easily made by one skilled in the art by modifying the appropriate step in the thermoforming operation.

The Velcro-type closure device more specifically consists of a loop-containing strip portion 83 attached to one terminal end 85 of the animal collar, as described above, and a hook-containing strip portion 87 extending out from loop-containing portion 83. The loop-containing portion 83 is preferably wider than the hook-containing portion 87. As would be obvious to one skilled in the art, the use of hooks on the wider portion and loops on the narrower portion is also possible.

The above-described hook-containing portion 87 and loop-containing portion 83 of the fastening means can be attached to terminal end 85 by any suitable means, i.e., adhesion, welding or the like.

When the collar is to be placed on an animal, the collar is positioned around the animal's neck to determine the appropriate length size for the particular animal. Once the size is determined, the collar is cut or otherwise separated along an appropriate cut mark 89 located in flat flexible strip 91 (FIGS. 18 and 19) which corresponds to flat flexible strip 9 or 19 (as shown in FIGS. 1 and 2 or FIGS. 3 and 4 respectively), thereby removing any excess collar length, and, as stated above, determining the appropriate amount of powdered material to be emitted in view of the animal's size. When the collar is cut at an appropriate cut mark, a second terminal end 93 as shown in FIGS. 18 and 19 having an opening 95 is formed.

When utilizing the collar fastening means illustrated in FIGS. 18 and 19, opening 95 is formed as a slot rather than as a hole or pore such as denoted in FIG. 2 by the number 11, FIG. 4 by the number 25 and FIG. 11 by the number 75. The modification of the shape of openings 95 allows for the easy insertion of hook-containing portion 87 through opening 95. For in order to fasten the collar on the animal, the collar is extended around the neck of the animal and the hook-containing portion 87 is inserted through opening or slot 95. Hook-containing portion 87 is then folded back around and over loop-containing portion 83. Portions 87 and 83 are then pressed together forming a closure as shown in FIG. 19. The terminal ends 85 and 93 are then held together until the consumer reverses the closure procedure.

As will be apparent to one skilled in the art, various modifications can be made within the scope of the aforesaid description. Such modifications being within the ability of one skilled in the art form a part of the present invention and are embraced by the appended claims.

It is claimed:

1. An animal collar made from a flexible material and containing a powdered material which is controllably emitted from said collar comprising:
   (a) a one piece bottom portion having a plurality of open top pouch-like sections, said sections containing said powdered material; and
   (b) a one piece top portion secured to said bottom portion to provide a unitary collar structure, said top portion sealing each of said pouch-like sections except for at least one opening which extends from the interior of said pouch-like sections to the exterior of said pouch-like sections, wherein said opening or openings have a diameter sufficient to allow for the movement of said powdered material from said pouch-like sections through said opening or openings.

2. The animal collar according to claim 1 wherein said opening or openings comprise a plurality of openings formed in said top portion of said collar, said plurality of openings being positioned over said bottom portion so that at least one of said plurality of openings is positioned in parallel relationship to each of said pouch-like sections in said bottom portion.

3. The animal collar according to claim 2 wherein said openings are formed by laser drilling.

4. The animal collar according to claim 2 wherein said opening or openings have a diameter in the range of from about 0.005 to about 0.025 inches.

5. The animal collar according to claim 1 wherein said opening or openings present in each of said pouch-like sections is formed in at least one lengthwise extending side wall of each of said pouch-like sections of said bottom portion.

6. The animal collar according to claim 5 wherein said opening or openings have a diameter in the range of from about 0.005 to about 0.125 inches.

7. The animal collar according to claim 1 wherein a fastening means is attached to a first terminal end of said collar and joined to the opposite terminal end of said collar utilizing an opening positioned in said opposite terminal end.

8. The animal collar according to claim 7 wherein said fastening means has a hook-containing portion, which is attached to said first terminal end of said collar, and a loop-containing portion, extending from said hook-containing portion, wherein said hook-containing portion is capable of extending through said opening in said opposite terminal end of said collar and back over said loop-containing portion where said hook-containing and loop-containing portions are secured to each other.

9. The animal collar according to claim 7 wherein said fastening means attached to said first terminal end of said animal collar comprises a pin, a slot and a pin-receiving member wherein said opposite terminal end containing said opening is passed through said slot of said fastening means and positioned over said pin-receiving member so that said pin can be passed through said opening into said pin-receiving member thereby joining said first terminal end and said opposite terminal end.

10. The animal collar according to claim 1 wherein said powdered material contains an active ingredient selected from the group consisting of an insecticidal, ectoparasitical, medicinal and animal grooming compositions.

11. The animal collar according to claim 10 wherein said powdered material additionally contains a particulate carrier.

12. The animal collar according to claim 1 wherein said powdered material has a particle size of from about 20 to about 250 microns.

13. The animal collar according to claim 1 wherein said flexible material is selected from the group consisting of polyvinyl chloride, polyethylene, and polypropylene.

14. A method of making an animal collar containing a powdered material which is controllably emitted from said collar comprising:
(a) thermoforming a flexible sheet of material to provide a plurality of connected open top cavities;
(b) filling each of said open top cavities with a powdered material;
(c) positioning a top sealing layer over said plurality of connected open top cavities; and
(d) securing said top sealing layer to said plurality of connected open top cavities sealing each of said open top cavities except for at least one opening in each of said cavities which extends from the interior of said cavities to the exterior of said cavities, wherein said opening or openings have a diameter sufficient to allow for the movement of said powdered material from said cavities through said opening or openings.

15. The method according to claim 14 wherein said opening or openings of step (d) comprise a plurality of openings formed in said top sealing layer, said plurality of openings being positioned over said cavities so that at least one of said plurality of openings is positioned in parallel relationship to each of said cavities.

16. The method according to claim 15 wherein said plurality of openings are formed by laser drilling.

17. The method according to claim 15 wherein said opening or openings each have a diameter in the range of from about 0.005 to about 0.025 inches.

18. The method according to claim 14 wherein said opening or openings of step (d) are formed in at least one lengthwise extending side wall of each of said cavities.

19. The method according to claim 18 wherein said opening or openings each have a diameter in the range of from about 0.005 to about 0.125 inches.

20. The method according to claim 14 wherein said powdered material has a particle size of from about 20 to about 250 microns.

21. The method according to claim 14 wherein a fastening means is attached to said collar.

22. The method according to claim 21 wherein said fastening means has a hook-containing portion attached to a first terminal end of said animal collar and a loop-containing portion extending from said hook-containing portion, wherein said hook-containing portion is capable of extending through an opening formed in the opposite terminal end of said animal collar and back over said loop-containing portion where said hook-containing and loop-containing portions are secured to each other.

23. The method according to claim 21 wherein said fastening means comprises a first terminal end having a pin, a slot, and a pin-receiving member which operate in conjunction with an opening in said animal collar's opposite terminal end wherein said opposite terminal end is passed through said slot of said fastening means and positioned over said pin-receiving member so that said pin can be passed through said opening of said opposite terminal end and into said pin-receiving member thereby joining said first terminal end and said opposite terminal end.

24. The method according to claim 14 wherein said powdered material contains an active ingredient selected from the group consisting of an insecticidal, ectoparasitical, medicinal and animal grooming compositions.

25. The method according to claim 24 wherein said powdered material additionally contains a particulate carrier.

26. The method according to claim 14 wherein said flexible material is selected from the group consisting of polyvinyl chloride, polyethylene, and polypropylene.

* * * * *

UNITED STATES PATENT AND TRADEMARK OFFICE
CERTIFICATE OF CORRECTION

PATENT NO. :  4,901,674
DATED      :  February 20, 1990
INVENTOR(S) : Bushman et al.

It is certified that error appears in the above-identified patent and that said Letters Patent is hereby corrected as shown below:

At column 6, line 49, please change "volumeric" to -- volumetric --.

At column 8, line 3, please change "Thus briefly," to -- Thus, briefly --.

At column 8, line 20, please change "in" to -- in. --.

At column 11, lines 20-22, please add the words -- can be -- between the words "and the loop-containing portion 83" and the words "attached thereto".

Signed and Sealed this

Twenty-second Day of January, 1991

Attest:

HARRY F. MANBECK, JR.

*Attesting Officer*     Commissioner of Patents and Trademarks